(12) United States Patent
Chen et al.

(10) Patent No.: US 10,742,966 B2
(45) Date of Patent: Aug. 11, 2020

(54) METHOD, SYSTEM AND RECORDING MEDIUM FOR ADAPTIVE INTERLEAVED IMAGE WARPING

(71) Applicant: HTC Corporation, Taoyuan (TW)

(72) Inventors: Jiun-Lin Chen, Taoyuan (TW); Yu-You Wen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 49 days.

(21) Appl. No.: 16/192,814

(22) Filed: Nov. 16, 2018

(65) Prior Publication Data

US 2019/0149809 A1 May 16, 2019

Related U.S. Application Data

(60) Provisional application No. 62/586,891, filed on Nov. 16, 2017.

(51) Int. Cl.
*H04N 13/344* (2018.01)
*H04N 13/366* (2018.01)
(Continued)

(52) U.S. Cl.
CPC ......... *H04N 13/344* (2018.05); *H04N 13/139* (2018.05); *H04N 13/161* (2018.05); *H04N 13/366* (2018.05)

(58) Field of Classification Search
CPC .............. G02B 27/017; G02B 27/0172; G02B 27/0176; G02B 27/0093;
(Continued)

(56) References Cited

U.S. PATENT DOCUMENTS

2013/0147686 A1\* 6/2013 Clavin ............... G06F 3/013
345/8
2016/0241836 A1\* 8/2016 Cole .................. H04N 13/194
(Continued)

FOREIGN PATENT DOCUMENTS

| CN | 204258990 | 4/2015 |
|---|---|---|
| CN | 105431763 | 3/2016 |
| CN | 105812768 | 7/2016 |

OTHER PUBLICATIONS

"Office Action of Taiwan Counterpart Application," dated Jul. 25, 2019, p. 1-p. 16.

*Primary Examiner* — Priyank J Shah
(74) *Attorney, Agent, or Firm* — JCIPRNET

(57) ABSTRACT

A method, system and recording medium for adaptive interleaved image warping are provided. The method is applicable to a display system having a head-mounted device (HMD) and a computing device. In the method, the computing device generates a plurality of image frames to be displayed on the HMD according to a frame rate, wherein the image frames generated to be displayed on a first display and a second display at a same time point comprise a first frame with a first resolution and a second frame with a second resolution lower than the first resolution. The generated image frames are transferred from the computing device to the HMD. The HMD restores the second frames with the second resolution among the image frames to a regular resolution of the first display and the second display, and then interleaved displays the first frames and the restored second frames on the first display and the second display.

16 Claims, 5 Drawing Sheets

(51) Int. Cl.
*H04N 13/161* (2018.01)
*H04N 13/139* (2018.01)

(58) Field of Classification Search
CPC ..... G02B 2027/0132–0136; G02B 2027/0174;
G02B 2027/0178; G06F 3/012; G06F
3/013; H04N 5/7491; H04N 13/344;
H04N 13/139; H04N 13/161
See application file for complete search history.

(56) References Cited

U.S. PATENT DOCUMENTS

| | | | |
|---|---|---|---|
| 2017/0372516 A1* | 12/2017 | Evans | G06T 15/20 |
| 2018/0139458 A1* | 5/2018 | Wang | H04N 19/154 |
| 2018/0196512 A1* | 7/2018 | Kim | G02B 27/0093 |
| 2018/0307304 A1* | 10/2018 | Bronder | A63F 13/25 |
| 2019/0014329 A1* | 1/2019 | Gao | G09G 5/003 |
| 2020/0051207 A1* | 2/2020 | Ogasawara | G09G 5/36 |

* cited by examiner

METHOD, SYSTEM AND RECORDING MEDIUM FOR ADAPTIVE INTERLEAVED IMAGE WARPING

CROSS-REFERENCE TO RELATED APPLICATION

This application claims the priority benefit of U.S. provisional application Ser. No. 62/586,891, filed on Nov. 16, 2017. The entirety of the above-mentioned patent application is hereby incorporated by reference herein and made a part of this specification.

BACKGROUND

Technical Field

The invention relates to a method and a system for virtual reality, and particularly relates to a method, a system and a recording medium for adaptive interleaved image warping.

Description of Related Art

Virtual reality (VR) is a technique that uses computer simulation technology to generate a virtual world in a three-dimensional (3D) space. The virtual world is composed of computer graphics, and by displaying frames on a head-mounted device (HMD) worn by a user, and in collaboration with sensors set on or set around user's body, an artificial environment which is mainly based on visual perception in collaboration with perceptions of auditory and tactile is provided. While experiencing the VR, the user not only has a feeling of immersing in the virtual world in visual perception, but may also act in the virtual world, or even interact with objects in the virtual world as in the real world.

To generate a fully immersing environment for the users, the improvement of image resolution is required. Since the requirement for image resolution is getting higher, the computation loading for the computing device to render image frames increases, and the data size of the image frames to be transmitted from the computing device to the HMD also increases. Eventually, reducing the data size and the computation loading in order to prevent the delay of data transmission while keeping the image quality could be challenging and unrealistic.

SUMMARY

The application is directed to a method, a system and a recording medium for adaptive interleaved image warping, which interleaved generate image frames for the left eye and right eye with different resolutions at a same time point, so as to reduce the data size of image frames.

The application provides an adaptive interleaved image warping method, which is applicable to a display system having a head-mounted device (HMD) and a computing device. The HMD includes a first display for a left and a second display for a right eye. In the method, the computing device generates a plurality of image frames to be displayed on the HMD according to a frame rate, wherein the image frames generated to be displayed on the first display and the second display at a same time point comprise a first frame with a first resolution and a second frame with a second resolution lower than the first resolution. The generated image frames are transferred from the computing device to the HMD. The HMD restores the second frames with the second resolution among the image frames to a regular resolution of the first display and the second display, and then interleaved displays the first frames and the restored second frames on the first display and the second display.

In an embodiment of the application, the first frame and the second frame generated to be displayed on the first display and the second display at a next time point are switched.

In an embodiment of the application, the method further includes detecting a computation loading of the computing device by the computing device, and adaptively adjusting the second resolution according to the detected computation loading.

In an embodiment of the application, the method further includes detecting a transmission bandwidth for transferring the generated image frames by the computing device, and adaptively adjusting the second resolution according to the detected transmission bandwidth.

In an embodiment of the application, the method further includes detecting a moving speed of a user wearing the HMD by the computing device, and adaptively adjusting the second resolution according to the detected moving speed.

In an embodiment of the application, the method further includes analyzing an image content in the image frames to be generated to detect a moving speed of a field of view (FOV) of the image content by the computing device, and adaptively adjusting the second resolution according to the detected moving speed.

In an embodiment of the application, the step of adaptively adjusting the second resolution according to the detected moving speed includes decreasing the second resolution if the detected moving speed exceeds a first threshold.

In an embodiment of the application, the first resolution is the regular resolution of the first display and the second display.

In an embodiment of the application, the method further includes restoring the first frames with the first resolution to the regular resolution if the first resolution is not equal to the regular resolution and interleaved displaying the restored first and second frames on the first and second display by the HMD.

The application provides a display system for adaptive interleaved image warping including a computing device and a HMD. The HMD is coupled to the computing device and includes a first display for a left eye and a second display for a right eye. The computing device is configured to generate a plurality of image frames to be displayed on the HMD according to a frame rate, wherein the image frames generated to be displayed on the first display and the second display at a same time point comprise a first frame with a first resolution and a second frame with a second resolution lower than the first resolution. The computing device is configured to transfer the generated image frames to the HMD. The HMD is configured to restore the second frames with the second resolution among the image frames to a regular resolution of the first display and the second display, and to interleaved display the first frames and the restored second frames on the first display and the second display.

In an embodiment of the application, the first frame and the second frame generated to be displayed on the first display and the second display at a next time point are switched.

In an embodiment of the application, the computing device is further configured to detect a computation loading of the computing device and adaptively adjust the second resolution according to the detected computation loading.

In an embodiment of the application, the computing device is further configured to detect a transmission bandwidth for transferring the generated image frames and adaptively adjust the second resolution according to the detected transmission bandwidth.

In an embodiment of the application, the display system further includes a locator which locates a user wearing the HMD and is configured to track a moving speed of the user wearing the HMD. The computing device is configured to connect with the locator through a network, detect the moving speed of the user and adaptively adjust the second resolution according to the detected moving speed.

In an embodiment of the application, the HMD includes a motion sensor which is configured to track a moving speed of a user wearing the HMD. The computing device is configured to detect the moving speed of the user, and is configured to adaptively adjust the second resolution according to the detected moving speed.

In an embodiment of the application, the computing device is further configured to analyze an image content in the image frames to be generated to detect a moving speed of a field of view (FOV) of the image content, and is configured to adaptively adjust the second resolution according to the detected moving speed.

In an embodiment of the application, the computing device is further configured to decrease the second resolution if the detected moving speed exceeds a first threshold.

In an embodiment of the application, the first resolution is the regular resolution of the first display and the second display.

In an embodiment of the application, the HMD is further configured to restore the first frames with the first resolution to the regular resolution if the first resolution is not equal to the regular resolution, and is configured to interleaved display the restored first and second frames on the first and second display.

The application provides a non-transitory computer readable recording medium, which is configured to record a program, wherein the program is loaded by a processor in a computing device to execute following steps. The computing device generates a plurality of image frames to be displayed on the HMD according to a frame rate, wherein the image frames generated to be displayed on the first display and the second display at a same time point comprise a first frame with a first resolution and a second frame with a second resolution lower than the first resolution. The generated image frames are transferred from the computing device to the HMD. The HMD restores the second frames with the second resolution among the image frames to a regular resolution of the first display and the second display, and the HMD interleaved displays the first frames and the restored second frames on the first display and the second display.

According to the above description, in the method, the system and the recording medium for adaptive interleaved image warping of the present application, image frames are interleaved displayed in which total pixel counts of at least one of the image frames to be displayed at the same time point are reduced, so as to reduce the computation loading of the computing device and the data size for transmission while keeping the quality of the image frames. As a result, viewing experience can be preserved without deteriorating image quality.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

According to the application, a computing device generates a plurality of image frames to be displayed on a head-mounted device (HMD). The images frames to be displayed for the left eye and the right eye at a same time point are generated with different resolution of which one is higher than the other, such that total pixel counts of the image frames to be generated by the computing device and a data size to be transferred to the HMD can be reduced. After the images frames are transferred to the HMD, the HMD restores the image frames with the reduced resolution to a regular resolution of the HMD and interleaved displays the restored image frames and the image frames originally with the regular resolution. Thus, the user's viewing experience can be preserved.

Figure 1:
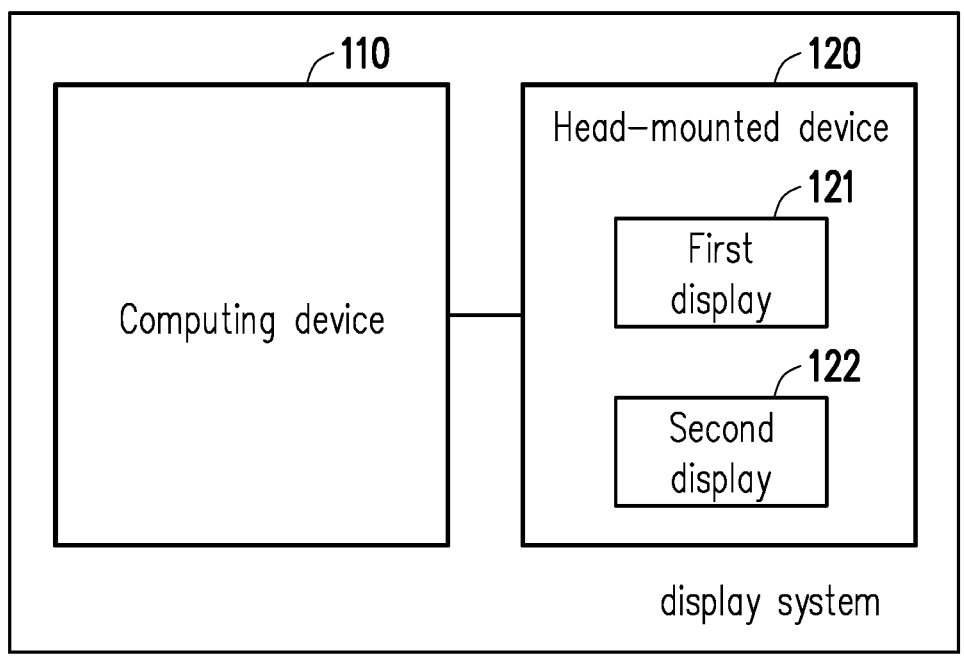
FIG. 1 is a block diagram of a display system according to an embodiment of the application.

FIG. 1 is a block diagram of a display system according to an embodiment of the application. Referring to FIG. 1, a display system 100 of the present embodiment includes a computing device 110 and a head-mounted device (HMD) 120, and functions thereof are described below.

The computing device 110 may be, for example, a file server, a database server, an application server, a workstation, a personal computer or a laptop with computing capability and includes a processor. The processor is, for example, a central processing unit (CPU), a graphics processing unit (GPU) or any other programmable microprocessor for general or special use, a digital signal processor (DSP), a programmable controller, an application specific integrated circuit (ASIC), a programmable logic device (PLD) or other similar devices, or a combination of these devices.

The HMD 120 is, for example, a liquid-crystal display (LCD), a light-emitting diode (LED) display or other suitable type of display, which is manufactured in a helmet or an eyeglass form for a user to wear on the head. In the present embodiment, the HMD 120 is coupled to the computing device 110 and includes a first display 121 for a left eye and a second display 122 for a right eye.

It should be mentioned that in an embodiment, the computing device 110 is disposed separately from the HMD 120, and coupled to the HMD 120 in a wired or a wireless manner for data transmission. In another embodiment, the computing device 110 can also be integrated in the HMD 120, and is connected with the HMD 120 through a transmission line for data transmission, which is not limited by the application. Detailed steps of the method for adaptive interleaved image warping of the application are described below.

Figure 2:
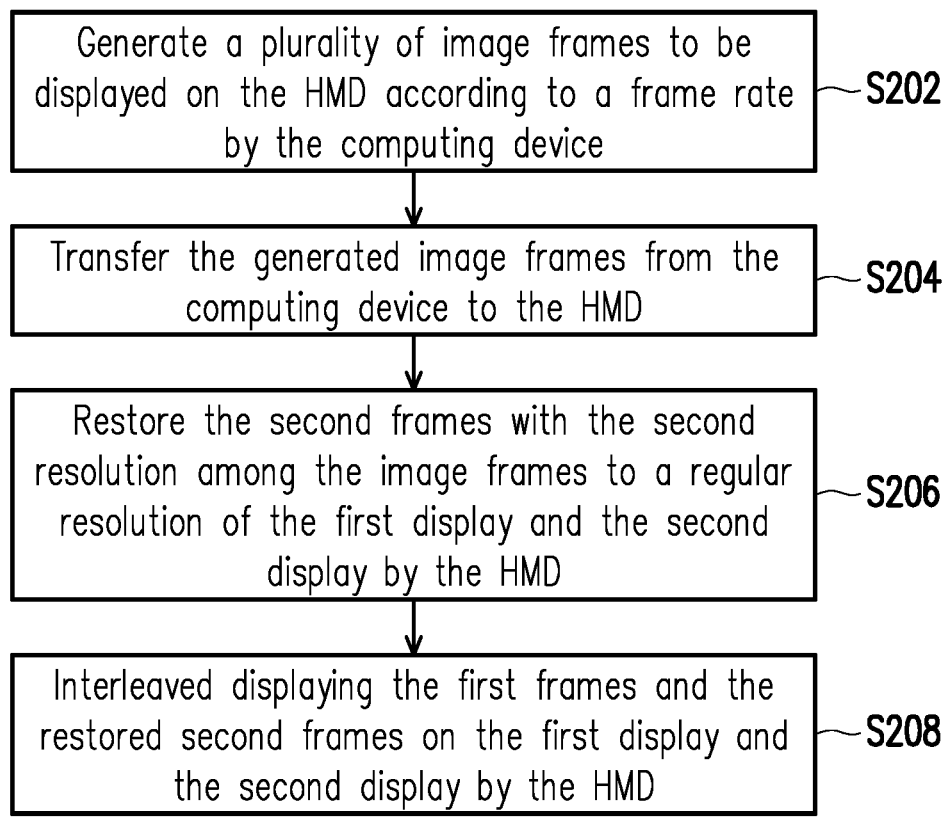
FIG. 2 is a flowchart illustrating a method for adaptive interleaved image warping according to an embodiment of the application.

FIG. 2 is a flowchart illustrating a method for adaptive interleaved image warping according to an embodiment of the application. Referring to FIG. 2, the method of the present embodiment is adapted to the display system 100 of FIG. 1, detailed steps of the method for adaptive interleaved image warping of the application are described below with reference of various components of the display system 100.

First, the computing device 110 generates a plurality of image frames to be displayed on the HMD 120 according to a frame rate (step S202). In detail, the image frames generated to be displayed on the first display 121 and the second display 122 at a same time point, for example, include a first frame with a first resolution and a second frame with a second resolution lower than the first resolution. Further, the computing device 110 switches the first frame and the second frame to be displayed on the first display and the second display at a next time point.

Figure 3A:
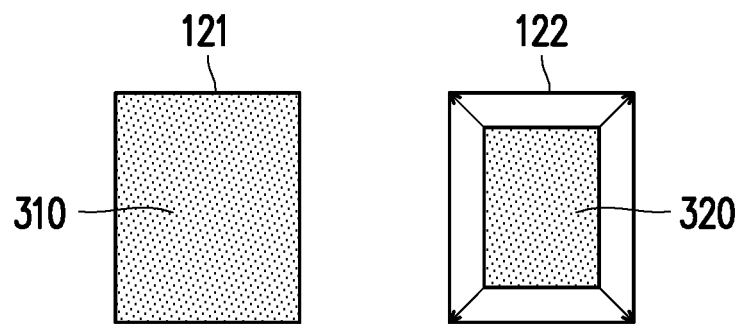
FIGS. 3A and 3B illustrate examples of image frames generated in the display system according to an embodiment of the application.
Figure 3B:
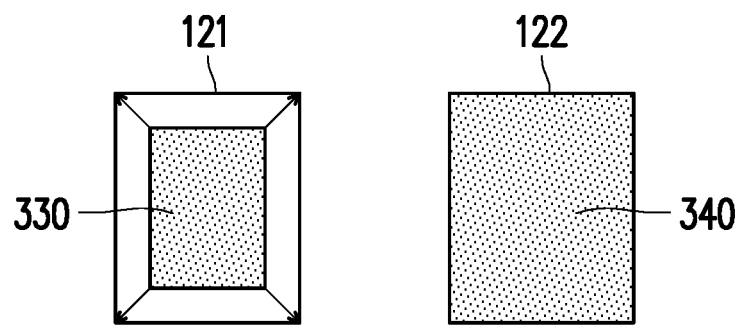

For example, FIGS. 3A and 3B illustrate examples of image frames generated in the display system according to an embodiment of the application. FIG. 3A respectively illustrates image frames 310 and 320 generated to be displayed on the first display 121 and the second display 122 at a same time point by the computing device 110.

Referring to FIG. 3A, the image frame 310 generated to be displayed on the first display 121 is with a first resolution and the image frame 320 generated to be displayed on the second display 122 is with a second resolution lower than the first resolution. In the present embodiment, the computing device 110 generates the image frame 320 with a lower resolution, so as to reduce data size of the image frame 320.

In the present embodiment, the first resolution is equal to the regular resolution of the first display 121 and the second display 122. However, in another embodiment, the first resolution of the image frame 310 may also be lower than the regular resolution of the first display 121 and the second display 122. In this circumstance, for example, the computing device 110 also reduces the data size of the image frame 310.

In another embodiment, the computing device 110 may further reduce the computation loading of the computing device by applying techniques to generate the image frames with a lower resolution, such as simplified resolution reduction, Y channel with color tone, interlaced rendered frame or checkered rendered image, which is not limited by the application.

FIG. 3B respectively illustrates image frames 330 and 340 generated to be displayed on the first display 121 and the second display 122 at a next time point of the time point of FIG. 3A and the image frames 330 and 340 are generated respectively with the second resolution and the first resolution. That is, the computing device 110 generates the image frame 340 to be displayed on the second display 122 with the first resolution and generates the image frame 330 to be displayed on the first display 121 with the second resolution lower than the first resolution.

Back to the flow in FIG. 2, after generating the image frames, the computing device 110 transfers the generated image frames to the HMD 120 (step S204). Then, the HMD 120 restores the second frames with the second resolution among the image frames to a regular resolution of the first display 121 and the second display 122 (step S206).

Referring to FIG. 3A, the HMD restores the image frame 320 to the regular resolution by enlarging the image frame 320, so as to generate a restored image frame (not illustrated) with the regular resolution of the second display 122. Referring to FIG. 3B, the HMD restores the image frame 330 to the regular resolution by enlarging the image frame 330, so as to generate a restored image frame (not illustrated) with the regular resolution of the first display 121. For example, the HMD may enlarge the image frames to the regular resolution of the first display 121 and the second display 122 by applying Interpolation method, such as Nearest Neighbor Interpolation, Bilinear Interpolation or Bicubic Interpolation, which is not limited by the application.

In another embodiment, if the first resolution of the image frames 310 and 340 are also reduced by the computing device 110, the HMD may further restore the image frames 310 and 340 with the first resolution to the regular resolution by enlarging the image frames 310 and 340, respectively.

Finally, the HMD 120 interleaved displays the first frames and the restored second frames on the first display 121 and the second display 122 (step S208). That is, the HMD 120 displays the first frame with the first resolution, which is equal to the regular resolution, and the restored second frame with the regular resolution respectively on the first display 121 and the second display 122 at a same time point, and then displays the first frame with the first resolution and the restored second frame with the regular resolution respectively on the second display 122 and the first display 121 at a next time point. Since the first frames and the restored second frames are interlaced on the first display 121 and the second display 122, a viewing experience similar to viewing the original full resolution frames can be achieved.

Figure 4:
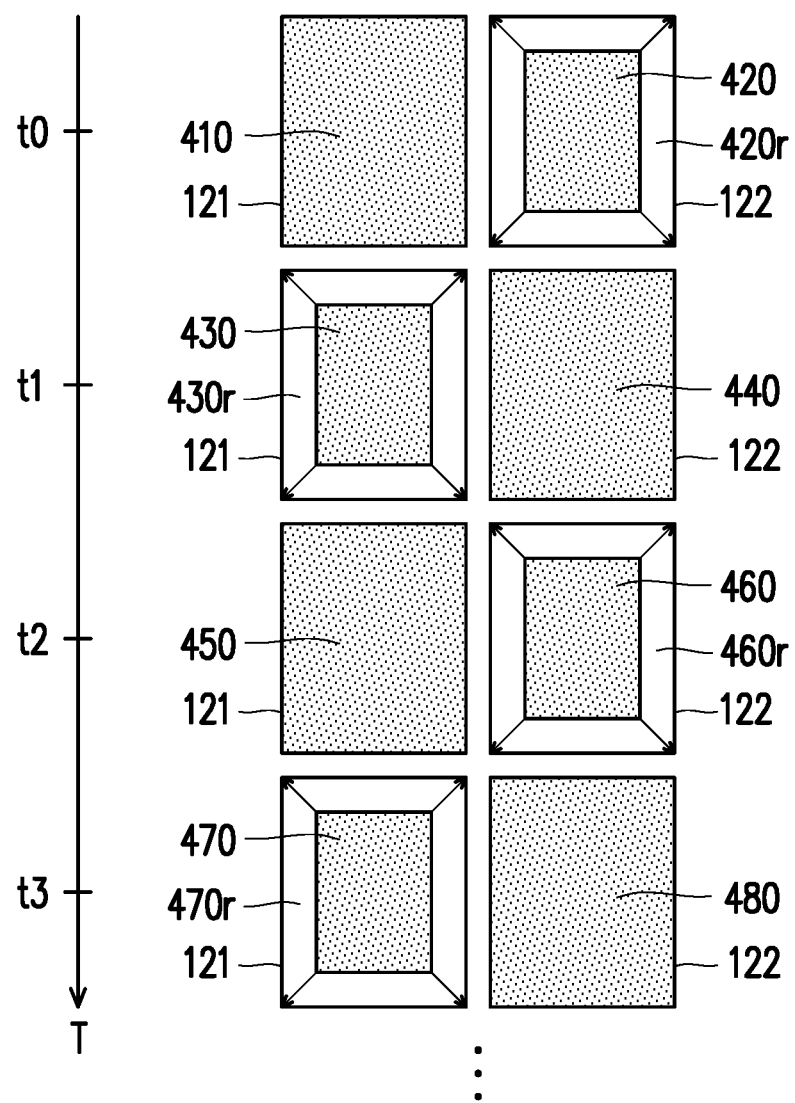
FIG. 4 illustrates an example of interleaved displaying image frames according to an embodiment of the application.

For example, FIG. 4 illustrates an example of interleaved displaying image frames according to an embodiment of the application. Referring to FIG. 4, a plurality of image frames are generated and displayed on the first display 121 and the second display 122 at different time points. At time point t0, the HMD 120 displays an image frame 410 with a first resolution, which is equal to a regular resolution of the first display 121, on the first display 121, and displays a restored image frame 420r with the regular resolution, which is restored from an image frame 420 with a second resolution, on the second display 122. At next time point t1, the HMD 120 displays an image frame 440 with the first resolution on the second display 122, and displays a restored image frame 430r with the regular resolution, which is restored from an image frame 430 with a second resolution, on the first display 121. At time point t2, the HMD 120 displays an image frame 450 with the first resolution on the first display 121, and displays a restored image frame 460r with the regular resolution, which is restored from an image frame 460 with a second resolution, on the second display 122. At time point t3, the HMD 120 displays an image frame 480 with the first resolution on the second display 122, and displays a restored image frame 470r with regular resolution, which is restored from an image frame 470 with a second resolution, on the first display 121. The HMD 120 may keep displaying the image frames and the restored image frames in the interleaved manner as illustrated above.

Based on the above, since the HMD interleaved displays the restored image frames and the image frames with the regular resolution for different eyes, a viewing experience similar to viewing the original full resolution frames can be achieved even if the computing device generates image frames with different resolution of which one is higher than the other for reducing the data size.

Further, based on different statuses detected by the computing devices 110 and the HMD 120, the computing device 110 may adaptively adjust the image frames to different resolution. In one embodiment, the first resolution and the second resolution may be adjusted at the same time. However, in another embodiment, the computing device 110 may detect a computation loading of itself and adaptively adjust the second resolution (i.e. the lower resolution) according to the detected computation loading. Namely, when the computation loading such as a GPU computation loading is high, the computing device 110 may further decrease the second resolution. In yet another embodiment, the computing devices 110 may detect a transmission bandwidth for transferring the generated image frames and adaptively adjust the second resolution according to the transmission bandwidth, so as to reduce the data size to be transferred and prevent delay of data transmission.

In one embodiment, since the user may not notice the reduction of image quality when performing fast movement, the resolution of the image frames to be generated may be adaptively reduced while the user's viewing experience can still be preserved. Accordingly, the computing device 110 may further detect a moving speed of a user wearing the HMD 120 so as to adaptively adjust the resolution of the images frames.

In detail, referring to FIG. 1, the display system 100 may further include at least one locator (not illustrated) which locates a position of the user wearing the HMD 120 and tracks the moving speed of the user. The locator includes, for example, a laser or an infrared (IR) emitter and receiver, which is adopted to detect a distance of an object in a three-dimensional (3D) space, and in collaboration with a plurality of calibrators configured on the object (for example, the HMD 120), a position of the object in the 3D space can be located. The locator can be disposed at a corner of the user's activity space, which is not only adopted to locate a position of the user in the 3D space, but is also adopted to define a boundary of the activity space. The computing device 110 may connect with the locator through a wired or a wireless manner for data transmission. Accordingly, the computing device 110 may adaptively adjust the resolution of the images frames to be generated according to the moving speed detected by the locator.

In another embodiment, the computing device 110 may detect and track the moving speed of the user by using a motion sensor. In detail, referring to FIG. 1, the HMD 120 may further include a motion sensor (not illustrated) such as a gravity sensor or a gyro sensor which tracks the moving speed of the user wearing the HMD 120. The motion sensor is capable of detecting a head rotation or an inclination angle of the user's head and feeding back the same to the computing device 110, such that the computing device 110 may adaptively adjusts the resolution of the images frames to be generated according to the moving speed detected by the motion sensor.

In one embodiment, instead of detecting the moving speed of the user, the computing device 110 may analyze the image content of the image frames to directly detect a moving speed of a field of view (FOV) of the image content so as to adjust the resolution of the image frames to be generated according to the detected moving speed. Further, since the user may not notice the reduction of image quality in an extremely fast moving image content, the resolution of the image frames to be generated may be adaptively reduced while the user's viewing experience can still be preserved.

Figure 5:
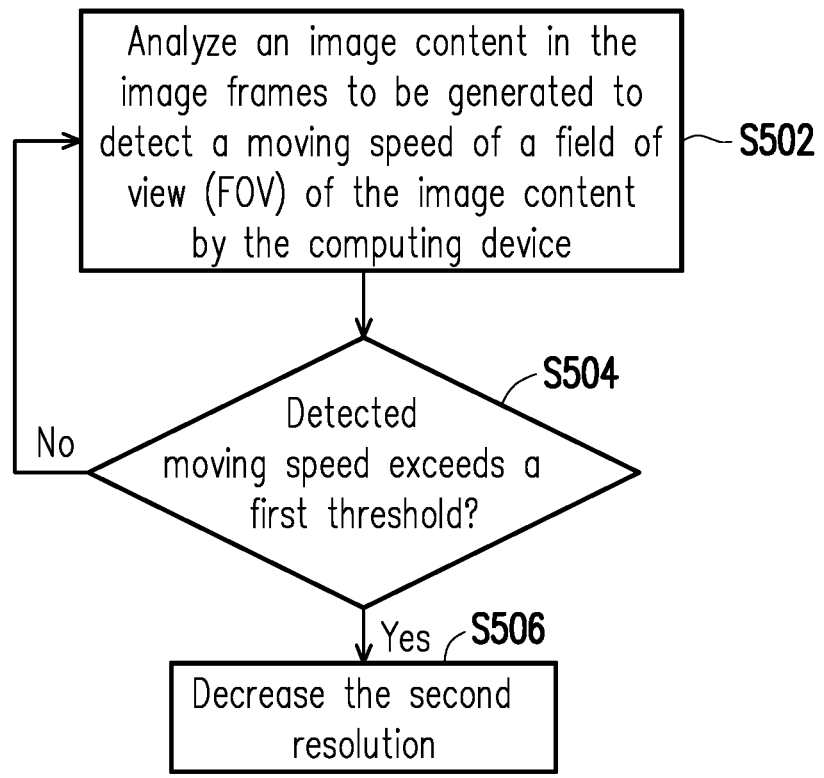
FIG. 5 is a flowchart illustrating a method for adaptively adjusting the resolution of the image frames according to an embodiment of the application.

In detail, FIG. 5 is a flowchart illustrating a method for adaptively adjusting the resolution of the image frames according to an embodiment of the application. In the present embodiment, the computing device 110 adjusts the resolution of the image frames according to a moving speed of a FOV of an image content in the image frames to be generated.

Referring to FIG. 5, the computing device 110 analyzes the image content in the image frames to be generated to detect the moving speed of the FOV of the image content (step S502). Then, the computing device 110 adaptively adjusts the second resolution according to the detected moving speed. In detail, the computing device 110 determines whether the detected moving speed exceeds a first threshold (step S504). If the detected moving speed exceeds the first threshold (yes in step S504), which means the image content changes too fast to be noticed by the user, the computing device 110 may decrease the second resolution (step S506) so as to further reduce the data size of the image frames to be generated. Otherwise, if the detected moving speed does not exceed the first threshold (no in step S504), the computing device 110 may keep the second resolution so as to preserve the viewing experience and continues to analyze the image content (step S502) to determine whether to change the second resolution.

Further, in addition to adaptively adjust the resolution of one of the image frames for the left eye and the right at the same time point, the computing device 110 may adaptively adjust the resolution of both image frames. That is, the computing device 110 may generate a first frame with a first resolution and a second frame with a second resolution lower than the first resolution to be displayed on the first display 121 and the second display 122 at a same time point, in which both the first resolution and the second resolution are less than the regular resolution of the first display 121 and the second display 122.

When receiving the image frames from the computing device 110, in addition to restore the second frames with the second resolution among the image frames to a regular resolution of the first display 121 and the second display 122, the HMD 120 may also determine whether the first resolution of the first frames is equal to the regular resolution of the first display 121 and the second display 122, and restore the first frames with the first resolution to the regular resolution if the first resolution is not equal to the regular resolution. As a result, the HMD 120 may interleaved display the restored first and second frames on the first and second display, so as to preserve a viewing experience while reducing the data size of the image frames.

The invention is further directed to a non-transitory computer readable recording medium configured to record a program which is loaded by a processor in a computing device to execute each step of the method for adaptive interleaved image warping. The computer program is composed of a plurality of program sections (for example, building an organization diagram program section, approving a list program section, setting a program section, and deploying a program section, etc.). After the program sections are loaded in the processing device and executed, the steps of the method for adaptive interleaved image warping can be completed.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An adaptive interleaved image warping method, applicable to a display system having a head-mounted device (HMD) and a computing device, wherein the HMD comprises a first display for a left eye and a second display for a right eye, the method comprising:

generating a plurality of image frames to be displayed on the HMD according to a frame rate by the computing device, wherein the image frames generated to be displayed on the first display and the second display at a same time point comprise a first frame with a first resolution and a second frame with a second resolution lower than the first resolution;

transferring the generated image frames from the computing device to the HMD;

restoring the second frames with the second resolution among the image frames to a regular resolution of the first display and the second display by the HMD; and interleaved displaying the first frames and the restored second frames on the first display and the second display by the HMD, wherein the method further comprises:
analyzing an image content in the image frames to be generated to detect a moving speed of a field of view (FOV) of the image content by the computing device; and
adaptively adjusting the second resolution according to the detected moving speed,
wherein the step of adaptively adjusting the second resolution according to the detected moving speed comprises:
decreasing the second resolution if the detected moving speed exceeds a first threshold.

2. The method according to claim 1, wherein the first frame and the second frame generated to be displayed on the first display and the second display at a next time point are switched.

3. The method according to claim 1, further comprising:
detecting a computation loading of the computing device by the computing device; and
adaptively adjusting the second resolution according to the detected computation loading.

4. The method according to claim 1, further comprising:
detecting a transmission bandwidth for transferring the generated image frames by the computing device; and
adaptively adjusting the second resolution according to the detected transmission bandwidth.

5. The method according to claim 1, further comprising:
detecting a moving speed of a user wearing the HMD by the computing device; and
adaptively adjusting the second resolution according to the detected moving speed of the user.

6. The method according to claim 1, wherein the first resolution is the regular resolution of the first display and the second display.

7. The method according to claim 1, further comprising:
restoring the first frames with the first resolution to the regular resolution if the first resolution is not equal to the regular resolution and interleaved displaying the restored first and second frames on the first and second display by the HMD.

8. A display system for adaptive interleaved image warping, comprising:
a computing device; and
a HMD, coupled to the computing device, comprising a first display for a left eye and a second display for a right eye,
wherein the computing device is configured to generate a plurality of image frames to be displayed on the HMD according to a frame rate, wherein the image frames generated to be displayed on the first display and the second display at a same time point comprise a first frame with a first resolution and a second frame with a second resolution lower than the first resolution,
wherein the computing device is configured to transfer the generated image frames to the HMD,
wherein the HMD is configured to restore the second frames with the second resolution among the image frames to a regular resolution of the first display and the second display, and interleaved display the first frames and the restored second frames on the first display and the second display,
wherein the computing device is further configured to:
analyze an image content in the image frames to be generated to detect a moving speed of a field of view (FOV) of the image content; and
adaptively adjust the second resolution according to the detected moving speed, wherein the computing device is further configured to decrease the second resolution if the detected moving speed exceeds a first threshold.

9. The display system according to claim 8, wherein the first frame and the second frame generated to be displayed on the first display and the second display at a next time point are switched.

10. The display system according to claim 8, wherein the computing device is further configured to:
detect a computation loading of the computing device; and
adaptively adjust the second resolution according to the detected computation loading.

11. The display system according to claim 8, wherein the computing device is further configured to:
detect a transmission bandwidth for transferring the generated image frames; and
adaptively adjust the second resolution according to the detected transmission bandwidth.

12. The display system according to claim 8, further comprising:
a locator, locating a user wearing the HMD and configured to track a moving speed of the user wearing the HMD,
wherein the computing device is configured to connect with the locator through a network, detect the moving speed of the user and adaptively adjust the second resolution according to the detected moving speed of the user.

13. The display system according to claim 8, wherein the HMD comprises:
a motion sensor, configured to track a moving speed of a user wearing the HMD,
wherein the computing device is configured to detect the moving speed of the user and adaptively adjust the second resolution according to the detected moving speed of the user.

14. The display system according to claim 8, wherein the first resolution is the regular resolution of the first display and the second display.

15. The display system according to claim 8, wherein the HMD is further configured to:
restore the first frames with the first resolution to the regular resolution if the first resolution is not equal to the regular resolution and interleaved display the restored first and second frames on the first and second display.

16. A non-transitory computer readable recording medium, configured to record a program, wherein the program is loaded by a processor in a computing device to execute following steps:

generating a plurality of image frames to be displayed on the HMD according to a frame rate by the computing device, wherein the image frames generated to be displayed on the first display and the second display at a same time point comprise a first frame with a first resolution and a second frame with a second resolution lower than the first resolution;

transferring the generated image frames from the computing device to the HMD;

restoring the second frames with the second resolution among the image frames to a regular resolution of the first display and the second display by the HMD; and interleaved displaying the first frames and the restored second frames on the first display and the second display by the HMD, wherein the method further comprises:

analyzing an image content in the image frames to be generated to detect a moving speed of a field of view (FOV) of the image content by the computing device; and adaptively adjusting the second resolution according to the detected moving speed, wherein the step of adaptively adjusting the second resolution according to the detected moving speed comprises:

decreasing the second resolution if the detected moving speed exceeds a first threshold.

* * * * *